(12) United States Patent
Patil et al.

(10) Patent No.: US 6,444,784 B1
(45) Date of Patent: Sep. 3, 2002

(54) WAX CRYSTAL MODIFIERS (LAW657)

(75) Inventors: Abhimanyu Onkar Patil, Westfield; Stephen Zushma, Clinton; Enock Berluche, Phillipsburg; Manika Varma-Nair, Warren, all of NJ (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 0 days.

(21) Appl. No.: 09/087,257

(22) Filed: May 29, 1998

(51) Int. Cl.⁷ .............................. C08G 67/02
(52) U.S. Cl. .................. 528/392; 526/325; 526/329; 526/330
(58) Field of Search .................. 526/325, 329, 526/330; 528/392

(56) References Cited

U.S. PATENT DOCUMENTS

| | | | |
|---|---|---|---|
| 3,814,690 A | 6/1974 | Song ........................ | 252/56 |
| 3,984,599 A | * 10/1976 | Norton ...................... | 428/339 |
| 4,661,121 A | 4/1987 | Lewtas ....................... | 44/70 |
| 4,670,130 A | 6/1987 | Dekraker et al. ............. | 208/33 |
| 4,772,674 A | 9/1988 | Shih et al. ................... | 526/325 |
| 5,179,182 A | 1/1993 | Brod et al. ................... | 526/227 |

FOREIGN PATENT DOCUMENTS

| | | | |
|---|---|---|---|
| EP | 0272133 | 6/1988 | ......... C08F/218/08 |
| EP | 0282342 | 9/1988 | ............. C10L/1/18 |
| EP | 0486103 | 5/1992 | ........... C08G/67/02 |
| GB | 1272614 | 5/1972 | ............. C10L/1/18 |
| JP | 02055790 | 2/1990 | ............. C10L/1/18 |

\* cited by examiner

Primary Examiner—Terressa M. Boykin
(74) Attorney, Agent, or Firm—Gerard J. Hughes; Joseph C. Wang

(57) ABSTRACT

The invention relates to a copolymer composition useful as wax crystal modifiers and flow improvers. The compositions are copolymers of a $C_6$ to $C_{250}$ straight-chain or branched dialkyl filmarate and at least one compound selected from the group consisting of carbon monoxide, $C_3$ to $C_{30}$ α-olefin, ethylene, styrene, and vinyl acetate.

22 Claims, No Drawings

WAX CRYSTAL MODIFIERS (LAW657)

FIELD OF THE INVENTION

The invention relates to wax crystal modifiers useful in improving the flow characteristics of lube oils and waxy crudes.

BACKGROUND

Many oils, especially crude oils, contain straight chain and branched alkanes that crystallize as their temperature is lowered. Alkane (wax) crystallization in these oils results in increased viscosity which leads to problems such as pipelining difficulties in crudes. The temperature at which wax begins to crystallize in an oil is called the wax appearance temperature (WAT) of the oil. Polymeric and copolymeric compounds can be combined with an oil in order to reduce an oil's WAT. Such additives, known as wax crystal modifiers, can be used as flow improvers in lubricating oils.

Lubricating oils and crude oils have quite different compositions. For example, crude oils contain inorganics, resins, and asphaltenes that are not present in lubricating oils beyond trace levels. Crude oils also contain hydrocarbons having a wider range of molecular weights. These factors contribute to a higher WAT than in lubricating oils. Crude oil WATs can range from about −15° C. to about 30° C., compared to a range of about −25° C. to about −5° C. for lubricating oils.

Dialkyl fumarate-vinyl acetate (DAF-VA) copolymers are used as lubricating oil flow improvers. These copolymers may be formed by the free radical polymerization of vinyl acetate and DAF esters having alkyls ranging in size from about 10 to about 18 carbon atoms. Such copolymers are effective lubricating oil flow improvers at temperatures ranging from about −25° C. to about −5°° C. Such flow improvers are not expected to be effective for crude oils because crude oil WATs are generally outside this temperature range.

There remains a need for polymers and copolymers useful for improving the flow properties of oils, and especially polymers and copolymers capable of improving the flow properties and pipelinability of crude oils.

SUMMARY OF THE INVENTION

In one embodiment, the invention is a copolymer of carbon monoxide and $C_6$ to $C_{250}$ straight-chain or branched dialkyl fumarate.

In another embodiment, the invention is a flow improver for use in an oleaginous fluid comprising one or more copolymers of dialkyl fumarate wherein the alkyl is straight chain or branched and ranges in size from $C_6$ to $C_{250}$ and carbon monoxide.

In another embodiment, the invention is a crude oil wax crystal modifier comprising a copolymer of dialkyl fumarate having straight chain or branched alkyls ranging in size from about $C_6$ to about $C_{250}$ and at least one compound selected from the group consisting of $C_3$ to $C_{30}$ alpha olefin, ethylene, styrene, carbon monoxide, and vinyl acetate.

In another embodiment, the invention is a method for improving the flow properties in an oleagenous fluid comprising: adding to a major amount of the oleagenous fluid a minor amount of at least one copolymer of dialkyl-fumarate having $C_6$ to $C_{250}$ straight chain or branched alkyls and at least one compound selected from the group consisting of $C_3$ to $C_{30}$ alpha olefin, ethylene, styrene, and carbon monoxide, provided that when the oleagenous fluid is a lubricating oil or a distillate oil that the compound is carbon monoxide.

In another embodiment, the invention is a method for forming a copolymer comprising:
dissolving a $C_6$ to $C_{250}$ straight-chain dialkyl fumarate in a solvent selected from the group consisting of hexane, benzene, cyclohexane, chloroform, xylene, oil, and heptane;
combining the dissolved dialkyl fumarate and an initiator selected from the group consisting of t-butyl peroxypivalate, benzoyl peroxide, t-butylper benzoate, and t-butyl peroxide in a reactor;
sealing the reactor and then purging the reactor with purified nitrogen;
pressurizing the reactor with at least one compound selected from the group consisting of carbon monoxide and ethylene to a pressure ranging from about 100 to about 3000 psig; and
heating the reactor to a temperature ranging from about 40° C. to about 200° C. for a time ranging from about 1 hour to about 48 hours in order to form the copolymer.

In another embodiment, the invention is a method for forming a copolymer comprising:
combining under free radical polymerization conditions a $C_6$ to $C_{250}$ straight-chain dialkyl fumarate in a solvent selected from the group consisting of hexane, benzene, cyclohexane, chloroform, xylene, oil, and heptane; at least one compound selected from the group consisting of ethylene and carbon monoxide; and an initiator selected from the group consisting of t-butyl peroxypivalate, benzoyl peroxide, t-butylper benzoate, and t-butyl peroxide, for a time, temperature, and pressure sufficient to form the copolymer.

In another embodiment, the invention is a method for improving the flow properties in an oleagenous fluid having at least one alkane species comprising:
determining a molecular weight distribution of the alkane species in the oleagenous fluid and then
adding to a major amount of the oleagenous fluid a minor amount of at least one copolymer of dialkylfumarate having straight chain or branched alkyls having substantially the same molecular weight distribution and at least one compound selected from the group consisting of $C_3$ to $C_{30}$ alpha olefin, ethylene, styrene, and carbon monoxide.

DETAILED DESCRIPTION OF THE INVENTION

The invention is based on the discovery that dialkylfumarate-containing copolymers having straight chain or branched alkyls ranging in size from about $C_6$ to about $C_{250}$ are effective flow improvers in oleaginous fluids such as fuel oils, lubricating oils, and crude oils. The invention is also based on the discovery that dialkylfumarate can be copolymerized with carbon monoxide.

Copolymers of the present invention having the formula:

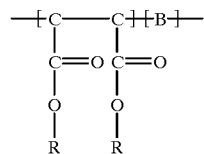

wherein B is formed from compounds selected from the group consisting of carbon monoxide, vinyl acetate, styrene, ethylene, and $C_3$ to $C_{30}$ alpha olefin and wherein R is branched or straight chain alkyl ranging from $C_6$ to $C_{250}$ are prepared as follows.

Dialkylfumarate esters having alkyls ranging up to $C_{250}$ are prepared by diesterification of fumaric acid with aliphatic alcohols in the presence of a p-toluene sulfonic acid catalyst. Alternatively, the esters can be prepared from fumaryl chloride and alkyl alcohols using an amine catalyst.

Comonomer B is formed from at least one compound selected from the group consisting of vinyl acetate, styrene, $C_3$ to $C_{30}$ α-olefin, ethylene, and carbon monoxide. The term copolymer is thus used in accordance with its more general meaning where the polymer comprises two or more different monomers.

R represents independently selected straight chain or branched alkyl groups of from about $C_6$ to about $C_{250}$ carbon atoms. Preferred alkyls range from about C8 to about $C_{40}$.

The copolymers of this invention can be synthesized using free-radical polymerization. In the case of copolymers of dialkyl fumarate with monomers like vinyl acetate, styrene or $C_3$ to $C_{30}$ α-olefins, polymerization can be carried out in a standard glass reactor. Typically, any inhibitors present in the monomers are removed via an inhibitor remover column. The purified monomers are then placed in tubes with the DAF ester monomers. The tubes are capped with septa and flushed with nitrogen for one to four hours before polymerization. The composition of monomers can be varied from about 5:95 to about 95:5 mole percent.

The reactions can be carried out in a solvent or neat. When a solvent is used, the solvent should be nonreactive or noninterfering in free radical polymerization. Such solvents include benzene, cyclohexane, hexane, heptane, etc. Solvents like xylene or oil can also be used. The solvent may be flushed with argon or nitrogen and then added to the monomers.

The polymerization reactions can be carried out from 40 to 100° C. depending on reactivity of monomers, half-life of the initiator used, or the boiling point of the solvent. The reactions are carried out under inert atmosphere. The solvents are brought to the reaction temperatures, and the initiator (dissolved in the appropriate solvents) is added to the solution. Typical free radical initiators includes dialkyl peroxides such as ditertiary-butyl peroxide, 2,5-dimethyl-2, 5-di-tertiary-butylperoxyhexane, di-cumyl peroxide; alkyl peroxides such as benzoyl peroxide; peroxy esters such as tertiary-butyl peroxypivalate, tertiary-butyl perbenzoate; and also compounds such as azo-bis-isobutyronitrile. A free radical initiator with an appropriate half life at reaction temperature of from about 60° C. to about 140° C. can be used. For the reactions done neat (without solvent), both monomers and initiator are loaded together, flushed with nitrogen, and then brought to reaction temperature. The components are stirred for a time sufficient to form a uniform mixture.

Reaction time ranges from about 1 hour to about 48 hours. The resulting polymer is isolated by precipitating the polymer in non-solvent (solvent in which polymer is not soluble). The product is then dried in vacuum oven.

When forming the compounds of the present invention from monomers that are gases at ambient temperature and pressure, such as ethylene and carbon monoxide, the reactions are generally carried out in high pressure reactors such as autoclave reactors. In such copolymerizations, the reactor is initially charged with monomers like dialkyl fumarate dissolved in a solvent such as hexane, and initiator is added. Typical initiators include t-butyl peroxypivalate, benzoyl peroxide, t-butylper benzoate, t-butyl peroxide. The reactor is sealed and purged with purified nitrogen. The reactor is then pressurized with carbon monoxide and/or ethylene monomer to appropriate pressure. The pressure can range from about 100 to about 3,000 psig. The preferred polymerization pressure ranges from about 500 to about 1,200 psig. Reaction temperature can range from about 40° C. to about 200° C., depending on solvent and the initiator half-life. The pressure of the reaction can be maintained for about one hour to about 48 hours depending on monomer reactivity, solvent, and the initiator half-life. The reactor is allowed to cool to room temperature and is then depressurized. A rotary evaporator is used to remove the solvent and obtain the product.

The products are generally characterized by standard techniques such as FTIR, NMR, and GPC.

According to the present invention, wax crystal modifiers are added to an oleaginous fluid such as oil in a concentration ranging from about 10 to about 50,000 ppm based on the weight of the oil. The preferred concentration is about 500 ppm. Non-limiting examples of oleaginous fluids containing paraffinic (alkane) species that benefit from the addition of the compounds of the invention include crude oils, i.e., oils as obtained from drilling and before refining or separating, fuel oils such as middle distillate fuel oil, and oils of lubricating viscosity ("lubricating oils").

It is believed that copolymer flow improvers of this invention when present in an effective amount are capable of inhibiting the nucleation and growth of wax crystals in oleaginous fluids such as oils. While not wishing to be bound by any theory, it is believed that the presence of an effective amount of copolymer results in a lowering the oil's wax appearance temperature because the copolymer molecules are sufficiently similar to the paraffinic crude species to incorporate themselves into growing wax crystals. Once incorporated, it is believed that the polymeric nature of the flow improver, i.e., its "branchiness" and high molecular weight, prevent the further addition of the crude's paraffinic species to the crystal. The presence of the copolymer in the growing wax crystal is also believed to alter the crystals' morphology by inhibiting growth that naturally tends towards undesirable large flat platelets. Such platelets are believed to result from the interlocking, intergrowth, and agglomeration of nucleated wax crystallites. Such changes in crystal shape resulting from copolymer incorporation greatly diminish the wax crystals' ability to interlock, intergrow, and agglomerate.

In the practice of the invention, it is desirable to first determine the molecular weight distribution of the paraffinic species present in the oil. It is believed that the compounds of the present invention are most effective when the molecular weight distribution of the alkyls present in the fumaric species of the copolymer is approximately the same as the molecular weight distribution of the oil's paraffinic species.

While the compounds of the present invention are useful in all oleaginous fluids containing paraffinic species, the preferred compound will depend on the type of fluid used.

For lubricating oils, for example, flow improvement is needed at temperatures much lower than are ordinarily required for crude oil. Consequently, copolymers with alkyls in the fumarate species ranging from about $C_{12}$ to about $C_{14}$ and molecular weights ranging from about 2000 to about 100,000 are preferred. In crude oils, compounds of reduced solubility are required, and the preferred compounds contain alkyls ranging from about $C_{15}$ to about $C_{40}$ and molecular weights ranging from about 2,000 to about 50,000. For distillate oils, preferred copolymers contain alkyls ranging from about $C_{10}$ to about $C_{22}$ and have molecular weights ranging from about 2,000 to about 20,000.

EXAMPLES

The invention is further described in the following non-limiting examples.

I. Synthesis of Dialkyl Fumarate Ester Monomers

Example 1

Monomer Synthesis from Fumaric Acid and 1-eicosanol

Into the reaction flask (equipped with a condenser and a Dean-Stark trap apparatus to remove the reaction water as it formed), were added 2.8 g (FW 116.07, 0.01875 moles) of fumaric acid, 11.2 g (0.0375 moles) of 1-eicosanol (FW 298.56), 0.3567 g (0.00188 mole) of p-toluenesulfonic acid monohydrate, and 50 mL to toluene. The mixture was heated at 130° C. for 18 hours under nitrogen. The reaction was then cooled to room temperature and filtered and solvent toluene was removed by a rotary evaporator to obtain the product (mp 71--73° C.). The $C_{20}$ fumarate ester product was characterized by IR and NMR spectroscopy. The IR spectrum of the product was recorded as the melted solid film in NaCl plates. The spectrum showed an ester peak at 1728 $cm^{-1}$ and a double bond absorption peak at 1647 $cm^{-1}$. $^{13}C$ NMR of the product showed the double bond absorption peak at 134.0 ppm (trans —HC=CH—, carbon) and the carbonyl ester peak at 165 ppm. The NMR spectrum also showed an absorption peak at 66 ppm due to a methylene next to ester functionality (—C(O)O—$CH_2$—). The absorption peaks in the aliphatic region are typical of the straight chain alkyl groups.

Example 2

Monomer Synthesis from Fumaric Acid and 1-docosanol

Using the procedure of Example 1, a $C_{22}$ fumarate ester product was formed. A $^{13}C$ NMR spectrum of the product showed a double bond absorption peak at 134.0 ppm (trans —HC=CH—, carbon) and a carbonyl ester peak at 165 ppm. There was also an absorption peak at 66 ppm due to a methylene next to ester functionality (—C(O)O—$CH_2$—).

Example 3

Monomer Formation from Fumaryl Chloride and Polyethylene Monoalcohol

Into a round bottom flask, 22.6 g (0.032 mole) of polyethylene monoalcohol (mw 700) available from Aldrich, Inc., Milwaukee, Wis., was placed with 300 mL toluene. The mixture was heated to 80° C. under nitrogen, and then 30 mL of triethylamine was added. 2.6 g (0.017 mole) of fumaryl chloride diluted with 25 mL of toluene was then slowly added over a period of 1 hour. After addition, the mixture was heated at 80° C. for 4 hours under nitrogen. The reaction mixture was then poured into 1500 mL of methanol containing 90 mL of HCl. The precipitated product was then filtered, washed with methanol, and dried in vacuum at 75° C. for 12 hours to obtain 23.1 g of the fumarate ester product.

An IR spectrum of the product showed an absorption peak due to ester carbonyl at 1724 $cm^{-1}$ and a small double bond peak at 1647 $cm^{-1}$. The spectrum also showed two sharp peaks at 729 and 719 $cm^{-1}$ similar to that of polyethylene. $^{13}C$ NMR of the product showed a double bond absorption peak at 134.0 ppm (—HC=CH—, carbon) and a carbonyl ester peak at 165 ppm. There was also an absorption peak at 66 ppm due to a methylene next to the ester functionality (—C(O)O—$CH_2$—). This peak was shifted with respect to the peak for methylene next to the —OH in PE—OH (HO—$CH_2$—) at 63 ppm.

Example 4

Monomer Formation from Fumaric Acid and Polyethylene-butylene Monoalcohol 0.15 g (0.00125 mole) of fumaric acid, 8.3 g (0.00125 mole) of polyethylene butylene monoalcohol($M_n$=3317), and 0.0238 g (0.00125 moles) of p-toluene sulfonic acid monohydrate were placed into a reaction flask and heated to 100° C. for 20 hours under nitrogen. The reaction product was then poured into water, separated, and washed with acetone. The residue was dried under vacuum.

An IR spectrum of the fumarate ester product showed an absorption peak due to the ester carbonyl at 1724 $cm^{-1}$ and a small double bond peak at 1647 $cm^{-1}$. The proton NMR spectrum showed a double bond absorption at 6.9 ppm (=CH, proton), and a —C(O)O$CH_2$— absorption peak at 4.2 ppm. The starting alcohol, EB—OH, showed a —$CH_2$OH peak at 3.7 ppm. Integration of —$CH_2$— from EB—OH and —$CH_2$— from —C(O)O$CH_2$— absorption peak showed that there was 34% unreacted EB in the product. Washing the product with water ensured that the product contained no unreacted fumaric acid.

II. Synthesis of Dialkylfumarate-Containing Copolymers by Free Radical Polymerization Hydroquinone inhibitor was removed from the vinyl acetate via through an inhibitor remover column. The purified vinyl acetate was placed in tubes with DAF ester monomers. The tubes were capped with septa and flushed with nitrogen for one hour. The solvent was flushed with nitrogen and added to the tubes containing the monomers. The solutions were brought to their reaction temperatures, and the initiator (dissolved in the appropriate solvents) was added to each monomer solution. For the runs done neat (without solvent), both monomers and initiator were loaded together, flushed with nitrogen, and then brought to reaction temperature. The mixtures were stirred overnight. After 24 hours, the polymer solutions were precipitated in methanol, vacuum dried, and then characterized by NMR and GPC. The results are summarized in Table 1. In:the table, mole ratios in wt % are monomer feed ratios, and mole ratios by NMR are product mole ratios.

TABLE 1

| Example Number | Monomers | Mole Ratio | Reaction Solvent | Initiator | Reaction Temperature | GPC Peak MW | GPC $M_n$ | GPC $M_w$ | $M_w/M_n$ |
|---|---|---|---|---|---|---|---|---|---|
| 5 | $C_{20}$ DAF/VA | 40/60 wt % 34/66 (NMR) | Benzene | 3% AIBN | 65° C. | 21,700 | 11,600 | 24,750 | 2.1 |
| 6 | $C_{22}$ DAF/VA | 40/60 wt % | Benzene | 3% AIBN | 65° C. | 15,700 | 8,100 | 16,800 | 2.1 |

TABLE 1-continued

| Example Number | Monomers | Mole Ratio | Reaction Solvent | Initiator | Reaction Temperature | GPC Peak MW | GPC $M_n$ | GPC $M_w$ | $M_w/M_n$ |
|---|---|---|---|---|---|---|---|---|---|
| 7 | $C_{20}$ DAF/VA | 38/62 (NMR) 57/43 wt % | Neat | 3% AIBN | 75° C. | 28,400 | 18,000 | 44,200 | 2.5 |
| 8 | $C_{22}$ DAF/VA | 27/73 (NMR) 57/43 wt % 26/74 (NMR) | Neat | 3% AIBN | 75° C. | 27,600 | 18,600 | 37,000 | 2.0 |

III. Synthesis of Dialkylfumarate-Alpha Olefin and Dialkyfumarate-Styrene Copolymers Polymerization procedures as set forth for examples 5 through 8 were used to synthesize copolymers of dialkyl-fumarate and styrene and alpha olefin. The reaction conditions and analysis results are set forth in Table 2. Mole ratio conventions are as set forth in Table 1.

TABLE 2

| Example Number | Monomers | Mole Ratio | Reaction Solvent | Initiator | Reaction Temperature | GPC Peak MW | GPC $M_n$ | GPC $M_w$ | $M_w/M_n$ |
|---|---|---|---|---|---|---|---|---|---|
| 9 | DAF-II/$C_{16}$ Alpha Olefin | 50/50 59.4/40.6 (NMR) | Chloroform | 3% AIBN | 65° C. | 2,727 | 1,080 | 2,556 | 2.4 |
| 10 | DAF-II/Styrene | 50/50 19.7/80.3 (NMR) | Chloroform | 3% AIBN | 65° C. | 21,492 | 10,589 | 20,731 | 1.96 |

IV. Synthesis of Dialkyfumarate-ethylene Copolymers

Example 11

A 300 mL autoclave engineer's reactor was charged with 10 g of dialkyl fumarate wherein the alkyls have an average of approximately 13 carbon atoms ($C_{13}$ DAF), 150 mL pure n-hexane, and 0.502 g of a 75% solution of t-butyl peroxypivalate in mineral spirits. [t-Butyl peroxypivalate has a 10 hour half-life at 55° C. in a 0.2 M benzene solution) (Swern, *Organic Peroxides*, John Wiley and sons, 1970, Vol. 1, pp. 82,87)]. The mixture was dissolved with stirring. The reactor was sealed and purged with purified nitrogen. The reactor was then pressurized with ethylene to 700 psig. The temperature was raised to 66° C. while stirring, and the pressure was maintained for 24 hours. The reactor was allowed to cool to room temperature, and was then depressurized. The hexane was removed with a rotary evaporator, leaving 20 g of the product.

IR spectra of the product suggested no unreacted DAF monomer. The IR spectra of the product indicated the presence of carbonyl at 1738 cm$^{-1}$ and two characteristic polyethylene peaks at 729 and 719 cm$^{-1}$. $^{13}$C NMR of this product was recorded in CDCl$_3$ using Chromium (III) acetylacetonate (Cr(acac)$_3$). $^{13}$C NMR of this product showed only an ester carbonyl absorption peak at 172 ppm. Integration of carbonyl peaks suggested 2.6% carbonyl carbons.

V. Synthesis of Dialkylfumarate-Carbon Monoxide Copolymer and Dialkylfumarate-Carbon Monoxide Ethylene Terpolymer Example 12

Dialkylfumarate-Carbon Monoxide Copolymers

A 300 mL autoclave engineer's reactor was charged with 5 g of dialkyl fumarate wherein the alkyls have an average of approximately 13 carbon atoms ($C_{13}$ DAF) dissolved in 150 ml n-hexane and 0.507 grams of a 75% solution of t-butyl peroxypivilate in mineral spirits The reactor was sealed and purged with purified nitrogen. The reactor was then pressurized with carbon monoxide to 700 psig. The temperature was raised to 66° C. while stirring and the pressure was maintained for 24 hours. The reactor was allowed to cool to room temperature and was then depressurized. Then hexane was removed on rotary evaporator leaving 4.5 grams of the product.

IR of the product showed a ester carbonyl peak at 1738 cm$^{-1}$ and disappearance of double bond peak in the DAF monomer at 1649 cm$^{-1}$. $^{13}$C NMR of this product was recorded in CDCl$_3$ using Cr(acac)$_3$ as a relaxation agent, allowing quantification of the spectrum. $^{13}$C NMR of this product showed complete disappearance of the double bond peak at 134 ppm and the monomer carbonyl peak at 165 ppm. The product showed two types of carbonyls (multiples peaks around 206 ppm and 172 ppm). The relative integration of the carbonyls in the product suggests that there is 10% CO incorporation from carbon monoxide in the copolymer.

GPC of the product was recorded in THF using polystyrene standards. GPC of the product showed that polymer had a Mn of 1547 and Mw of 2228.

Example 13

A 300 ml autoclave engineer's reactor was charged with 2.5 g of didocosanyl fumarate ($C_{22}$ fumarate ester) dissolved in 150 mL n-hexane and 0.502 g of a 75% solution of 1-butyl peroxypivalate in mineral spirits The reactor was sealed and purged with purified nitrogen. The reactor was then pressurized with carbon monoxide to 700 psig. The temperature was raised to 66° C. while stirring and the pressure was maintained for 24 hours. The reactor was allowed to cool to room temperature and was then depressurized. Then hexane was removed on rotary evaporator leaving 4.5 g of the product. An IR of the product showed an ester carbonyl peak at 1740 cm$^{-1}$ and disappearance of the double bond peak in the DAF monomer at 1649 cm$^{-1}$. $^{13}$C NMR of this product was recorded in CDCl$_3$ using Cr(acac)$_3$ as a relaxation agent, allowing quantification of the spectrum. $^{13}$C NMR of this product showed complete disappearance of the double bond peak at 134 ppm and monomer carbonyl peak at 165 ppm. The product showed two types of carbonyls peaks around 206 ppm and 172 ppm. GPC of the product was recorded in THF using polystyrene standards. GPC of the product showed that polymer had a Mw of 2840.

Example 14

Dialkylfumarate-Carbon Monoxide-Ethylene Teripolymers

A 300 ml autoclave engineer's reactor was charged with 10 g of dialkyl fumarate wherein the alkyls have an average of approximately 13 carbon atoms ($C_{13}$ DAF) dissolved in 150 ml n-hexane and 0.504 grams of a 75% solution of t-butyl peroxypivalate in mineral spirits The reactor was sealed and purged with purified nitrogen. The reactor was then pressurized with ethylene/carbon monoxide (90:10) mixture to 700 psig. The temperature was raised to 66° C. while stirring and the pressure was maintained for 24 hours. The reactor was allowed to cool to room temperature and was then depressurized. Then hexane was removed on rotary evaporator leaving 13.9 grams of the product.

IR spectra of the product showed a carbonyl ester peak at 1724 $cm^{-1}$ and polyethylene peaks at 723 $cm^{-1}$. IR spectra of the product also showed absence of double bond peak due to unreacted DAF monomer. $^{13}C$ NMR of this product was recorded in $CDCl_3$ using $Cr(acac)_3$ as a relaxation agent, allowing quantification of the spectrum. $^{13}C$ NMR of this product suggested that there were two types of carbonyls, namely ester and ketone in the terpolymer. The measurements revealed the presence of multiple peaks around 210 ppm resulting from ketones and an absorption peak at 173 ppm resulting from an ester. NMR spectra also showed that there were no absorption peaks due to unreacted DAF monomer ester (165 ppm) and unreacted double bond (134 ppm). GPC of the product was recorded in THF using polystyrene standards. GPC showed multiple peaks, with peaks at 661184, 15599 and 1375 g/mole. The product was soluble in hexane and THF. From this observation, we concluded that the product could not be either high molecular weight PE or ECO copolymer because both of these materials are insoluble in hexane. Varying the amount of ethylene monomer in the reaction can be used to control the molecular weight, and thus, the crystallinity and solubility of the polymers.

VI. Performance of Dialkylfumarate-Containing Copolymers as Wax Crystal Modifiers in Crude Oil The results are summarized in Table 3.

The performance of the products from examples 5, 7, 10, 11, 12, 13, and 14 were evaluated using differential scanning calorimetry (DSC) with liquid nitrogen cooling. Measurements were conducted over a temperature ranging from about −140° C. to about 100° C. on both heating and cooling at a rate of 10° C./minute. Nitrogen was used as a purge gas at 50 $cm^3$/minute. All solutions were warmed to about 60° C. before sampling, and care was taken to ensure that the additive compounds were soluble in the oils. Hermetically sealed aluminum pans were used for all measurements to prevent any loss of low volatility components.

Wax Appearance Temperature (WAT) is a measure of the thermodynamic barrier for the formation of a stable nucleus for further crystal growth. The WAT is the temperature at which stable wax crystals first begin to appear. For wax crystallization to occur, supercooling is required to overcome the free energy barrier to nucleation. A lower WAT is desirable in an oil because it is indicative of a larger thermodynamic barrier to further wax crystal growth. Additive compounds that inhibit wax crystal nucleation increase the free energy barrier and decrease the WAT. The wax appearance temperatures (WAT) of Alaskan North Slope Crude with and without the experimental additives were determined by cooling the crude at 10° C./minute. The WAT for the untreated Alaskan North Slope Crude was 14.35° C. With the additive of Example 5, the WAT was 13.71° C. at 500 ppm additive concentration; with the additive of Example 11 at 500 ppm additive concentration, it was 11.00° C. The effect of change in additive concentration of Example 5 was studied using DSC. The results are summarized in Tables 3 and 4.

The additive in Example 5 was also evaluated by a pour point test. At 0.5 wt % concentration, the pour point of the Alaskan North Slope Crude was decreased by 7° C. These results indicate that these additives are active as wax crystal modifiers.

TABLE 3

| Sample | Wax Appearance Temperature, ° C. |
|---|---|
| Untreated Crude | 14.35 |
| 500 ppm of Example 5 | 13.45 |
| 500 ppm of Example 11 | 11.00 |
| 500 ppm of Example 12 | 13.30 |
| 500 ppm of Example 14 | 13.05 |
| 500 ppm of Example 7 | 13.35 |
| 500 ppm of Example 10 | 13.35 |
| 500 ppm of Example 131 | 11.60 |

TABLE 4

| Amount of Additive #5 in Crude (PPM) | Wax Appearance Temperature, ° C. |
|---|---|
| 0 | 14.35 |
| 512 | 13.71 |
| 250 | 11.14 |
| 5048 | 8.30 |

What is claimed is:

1. A copolymer comprising carbon monoxide monomers and $C_6$ to $C_{250}$ dialkyl fumarate monomers, the dialkyl fumarate monomers having straight-chain or branched alkyl groups.

2. The copolymer of claim 1 wherein the alkyl groups range from $C_6$ to $C_{150}$ alkyl groups.

3. The copolymer of claim 2 wherein the alkyl groups range from about $C_8$ to about $C_{40}$ alkyl groups.

4. The copolymer of claim 3 wherein the alkyl groups are straight-chain alkyl groups.

5. A flow improver for use in an oleaginous fluid comprising one or more copolymers of $C_6$ to $C_{250}$ dialkyl fumarate monomers and carbon monoxide monomers, the dialkyl fumarate monomers having straight-chain or branched alkyl groups.

6. The flow improver of claim 5 wherein the alkyl groups range from $C_6$ to $C_{150}$ alkyl groups.

7. The flow improver of claim 6 wherein the alkyl groups range from about $C_8$ to about $C_{40}$ alkyl groups.

8. The flow improver of claim 7 wherein the alkyl groups are straight-chain alkyl groups.

9. A wax crystal modifier for use in a crude oil having at least one alkane species, comprising:

a copolymer of dialkyl fumarate monomers and at least one compound selected from the group consisting of styrene monomers and carbon monoxide monomers, the dialkyl fumarate monomers having straight-chain or branched alkyl groups ranging in size from about $C_6$ to about $C_{250}$.

10. The wax crystal modifier of claim 9 wherein the alkyl groups range in size from $C_6$ to $C_{150}$.

11. The wax crystal modifier of claim 10 wherein the alkyl groups range in size from about $C_{15}$ to about $C_{40}$.

12. A method for improving the flow properties in an oleaginous fluid, the method comprising: adding to a major amount of the oleaginous fluid a minor amount of at least one copolymer of dialkylfumarate monomers and at least one compound selected from the group consisting of styrene monomers and carbon monoxide monomers, the dialkyl fumarate monomers having from $C_6$ to $C_{250}$ straight-chain or branched alkyl groups.

13. A method for forming a copolymer, the method comprising:

dissolving a $C_6$ to $C_{250}$ straight-chain dialkyl fumarate monomer in a solvent selected from the group consisting of hexane, benzene, cyclohexane, chloroform, xylene, oil, and heptane;

combining in a reactor the dissolved dialkyl fumarate monomer and an initiator selected from the group consisting of t-butyl peroxypivalate, benzoyl peroxide, t-butyl perbenzoate, and t-butyl peroxide in a reactor;

sealing the reactor and then purging the reactor with purified nitrogen;

pressurizing the reactor with carbon monoxide to a pressure ranging from about 100 to about 3000 psig; and heating the reactor to a temperature ranging from about 40° C. to about 200° C. for a time ranging from about 1 hour to about 48 hours in order to form the copolymer.

14. The method of claim 13 wherein the pressure ranges from about 500 psig to about 1200 psig, the temperature ranges from about 50° C. to about 100° C., the solvent is hexane, and the initiator is t-butyl peroxypivilate.

15. The method of claim 14 further comprising cooling and depressurizing the reactor and then recovering the copolymer from the solvent.

16. A method for forming a copolymer, the method comprising:

combining in a reactor under free radical polymerization conditions a $C_6$ to $C_{250}$ straight-chain dialkyl fumarate monomer in a solvent selected from the group consisting of hexane, benzene, cyclohexane, chloroform, xylene, oil, and heptane; carbon monoxide; and an initiator selected from the group consisting of t-butyl peroxypivalate, benzoyl peroxide, t-butyl perbenzoate, and t-butyl peroxide, for a time, temperature, and pressure sufficient to form the copolymer.

17. The method of claim 16 wherein the pressure ranges from about 500 psig to about 1200 psig, the temperature ranges from about 50° C. to about 100° C., the solvent is hexane, and the initiator is t-butyl peroxypivilate.

18. The method of claim 17 further comprising cooling and depressurizing the reactor and then recovering the copolymer from the solvent.

19. A method for improving the flow properties in an oleaginous fluid having at least one alkane species, comprising the steps of:

(a) determining a molecular weight distribution of the alkane species in the oleaginous fluid; and (b) adding to a major amount of the oleaginous fluid a minor amount of at least one copolymer of dialkylfumarate monomers and at least one compound selected from the group consisting of styrene monomers and carbon monoxide monomers, the dialkyl fumarate monomers having straight-chain or branched alkyl groups with substantially the same molecular weight distribution as the alkane species in the oleaginous fluid.

20. The copolymer of claim 1 further comprising styrene monomers.

21. The wax crystal modifier of claim 9 wherein the alkyl groups of the dialkyl fumarate monomers are straight-chain and have a molecular weight distribution substantially the same as the alkane species of the crude oil.

22. The method of claim 12 wherein the compound comprises carbon monoxide monomers when the oleaginous fluid comprises a lubricating oil or a distillate oil.

* * * * *